United States Patent [19]
Johnson

[11] 3,857,195
[45] Dec. 31, 1974

[54] MULCH PACKET

[76] Inventor: Arthur L. Johnson, 1129 Erin St., Madison, Wis. 53715

[22] Filed: Oct. 1, 1973

[21] Appl. No.: 402,100

[52] U.S. Cl.............................. 47/32, 47/9, 47/25
[51] Int. Cl............................................ A01g 13/10
[58] Field of Search............................ 47/32–33, 9, 47/25, 27, 30, 48.5

[56] References Cited
UNITED STATES PATENTS

| | | | |
|---|---|---|---|
| 1,554,865 | 9/1925 | Magoon | 47/32 UX |
| 1,704,801 | 3/1929 | Miller | 47/30 |
| 2,542,555 | 2/1951 | Moores | 47/9 X |
| 2,782,561 | 2/1957 | Smith | 47/25 |
| 2,822,644 | 2/1958 | Berger | 47/32 |
| 2,949,698 | 8/1960 | Downey et al. | 47/9 |
| 3,005,287 | 10/1961 | Dudley | 47/25 |
| 3,059,379 | 10/1962 | Attoe | 47/48.5 |
| 3,755,965 | 9/1973 | Emery | 47/27 |

Primary Examiner—Robert E. Bagwill
Attorney, Agent, or Firm—Andrus, Sceales, Starke & Sawall

[57] ABSTRACT

A mulch packet for application to soil surrounding a plant. The packet includes a perforated base sheet of moisture impermeable material, and a moisture degradable cover layer is joined to the base along the periphery, as well as at the central postion, of the packet. A mulch material, and in some cases fertilizers, minerals and soil additives, are located within the compartment between the base sheet and the cover layer. The central portion of the packet is provided with a series of knockout concentric rings, and a radial slit connects the innermost ring to the periphery of the packet. Depending on the size of the trunk of the plant, the corresponding scored ring can be punched out to enable the packet to surround the trunk. The upper surface of the packet is preferably concave so as to retain water and insure that the water will percolate downwardly through the mulch material and other contained components into the soil.

6 Claims, 5 Drawing Figures

PATENTED DEC 31 1974 3,857,195

MULCH PACKET

BACKGROUND OF THE INVENTION

Mulch is frequently placed on the soil surrounding newly planted or established trees and plants and serves as a protective covering to retain moisture in the soil and to inhibit weed growth.

It is the usual practice in parks or other areas where large numbers of trees are being planted for separate crews to dig the holes, plant the trees, and to mulch and stake the trees. To mulch the newly planted trees a substantial volume of mulch must be transported and handled which requires considerable manual labor.

It is also desirable for homeowners when planting limited numbers of trees or shrubs to apply mulch around the trees or shrubs. However, mulch is generally not available except in large volume packages which thereby restricts the use of mulch by a homeowner when planting a limited number of trees.

In the past, mulch packets have been devised which are to be placed on the soil around the tree or plant. However, the mulch packets sold in the past have not been completely successful in that the packets required individual trimming of the packet in order to fit the trunk of the tree or plant, or required staking to hold the packet down on the soil, or were expensive to fabricate.

SUMMARY OF THE INVENTION

The invention relates to an improved mulch packet to be applied to the soil surrounding a plant, such as a tree or shrub. The packet is composed of a perforated base formed of a moisture impermeable material, such as plastic, and a moisture degradable cover layer which is joined to the base along the outer periphery and at the central area of the packet.

Mulch, and preferably a fertilizer, and in some cases minerals and soil additives, are located within the compartment between the cover layer and the base. During use, water will seep through the water permeable cover and percolate through the mulch and fertilizer and be discharged into the soil through the perforations in the base sheet. The upper surface of the cover layer can be concave in order to retain water and insure that the water will percolate downwardly through the mulch and fertilizer.

The central portion of the packet is provided with a series of concentric scored rings and a radial slit extends between the periphery of the packet and the innermost ring. To install the packet around the trunk of a tree or shrub, the ring of the desired size is punched out and by virtue of the slit, the packet is positioned around the trunk.

The mulch packet of the invention is a prefabricated unit which contains mulch, and can also contain fertilizer and/or weed killing agents, minerals, soil additives, and the like. As all of these ingredients are contained within the packet, the use of the packet eliminates the handling of the various separate ingredients and insures that the necessary amount of each ingredient is uniformly applied to the soil surrounding the plant.

The mulch itself retains moisture and the plastic base sheet serves as a moisture barrier to retard evaporation of moisture from the soil.

By including fertilizer in the packet the plant growth is stimulated and by incorporating weed killing agents within the packet the growth of weeds in the soil beneath the package is retarded.

As the packet contains a series of concentric knockout rings at its center, a single packet can be employed for various diameters of tree trunks.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
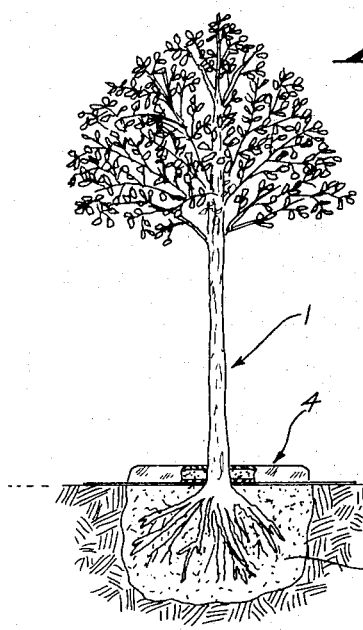
FIG. 1 is a side elevation of a tree with the mulch packet of the invention located on the soil surrounding the trunk of the tree.
Figure 2:
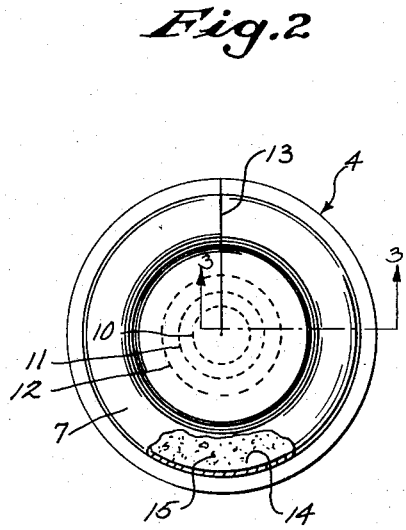
FIG. 2 is a plan view of the packet.

FIG. 1 illustrates a tree 1 having a balled or bare root system 2, which is planted within a hole in the ground or soil 3. The mulch packet 4 of the invention is positioned on the soil 3 and surrounds the trunk of the tree 1.

Figure 3:
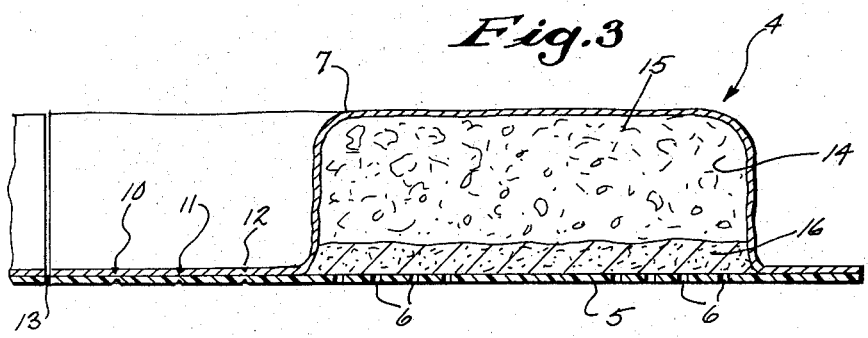
FIG. 3 is a section taken along line 3—3 of FIG. 2.

As best illustrated in FIG. 3, the mulch packet 4 includes a perforated sheet 5 of water impervious material, such as polyethylene. The base sheet 5 is provided with a series of small holes 6 or perforations through which water can pass downwardly into the soil 3. The base sheet 5 can be opaque which will aid in preventing light from being transmitted through the packet to the soil and thus reduce weed growth beneath the packet 4.

The packet 4 also includes a cover layer 7 which is attached to the base sheet 5 at the outer periphery as well as at the central area of the packet. The cover layer 7 and base sheet 5 can be connected together by any desired means, such as adhesives or auxilliary fasteners.

The cover layer 7 is formed of a water permeable, water degradable material, such as paper or other cellulosic fiber products. As illustrated in FIG. 3, the cover layer is formed of a series of superimposed layers 8 of tissue-type paper which are joined together through pressure welds 9 to provide an integral structure. The various layers of paper permit water to readily penetrate the cover layer and will be degradable over a period of time.

The central portion of the packet is provided with three concentric scored rings 10, 11 and 12 and a slit 13 extends from the innermost ring 10 to the outer periphery of the packet. Depending on the diameter of the tree 1, the scored ring of the appropriate size can be knocked or punched out and the packet can be installed around the tree by inserting the tree trunk through the slit 13 and into the knocked out opening in the center of the packet.

The base sheet 5 sand cover layer 7 define a chamber 14 which contains a mass of mulch 15, as well as fertilizer pellets 16. The mulch 14 can take the form of any conventional mulch, such as wood chips, sawdust, shredded leaves, shredded paper, fibrous materials, and the like.

The fertilizer 16 can be a natural fertilizer, such as sheep or cow manure, or can be any one of the readily available commercial-type fertilizers.

The cover layer 7 serves as a cover for the mulch and fertilizer within the chamber 14 and also due to its opaque nature, prevents weed growth in the soil beneath the packet. As a further advantage, the layer 7, as well as the mulch, serves as insulation which maintains the root system of newly planted trees cooler during summer months and deters light frost.

When water is applied to the upper surface of the cover layer 7 either through natural conditions, such as rain, or through sprinkling, the water will penetrate the cover layer 7 and percolate downwardly through the mulch 14 and fertilizer 15. The fertilizer can be a time-delay type in which various size pellets are utilized so that the fertilizer will dissolve in the water over an extended period of time. Alternately, the fertilizer can be a mixture of various types of fertilizers, each of which has a different rate of release. After percolating downwardly through the mulch, and/or other additives, the water will then pass downwardly through the openings in the base sheet 5 and onto the soil.

Figure 4:
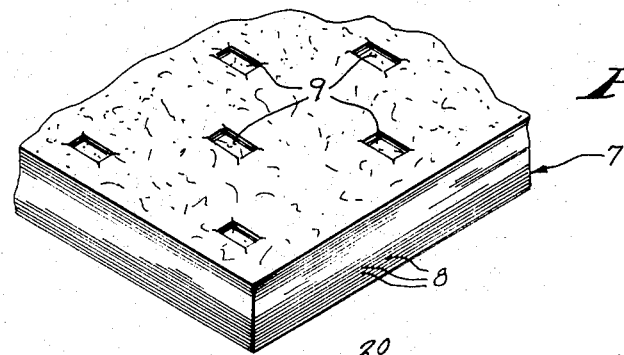
FIG. 4 is a fragmentary perspective view of the cover layer.
Figure 5:
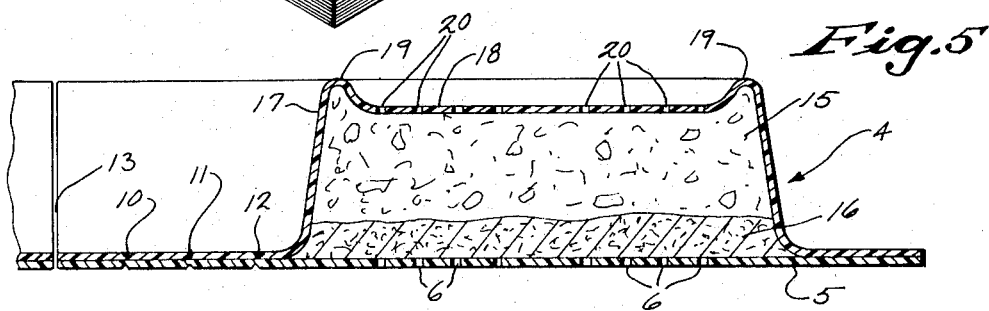
FIG. 5 is a view similar to FIG. 3 showing a modified form of the invention.

FIG. 4 illustrates a modified form of the invention in which the cover layer 17, which corresponds to the cover layer 7 of the first embodiment, is formed of a molded cellulosic fiber material. The upper surface 18 of the cover is provided with a pair of generally concentric ridges 19 which serve to retain the water applied to the upper surface of the packet, or alternately, the upper surface 17 of the cover 16 can be formed with a generally concave contour to retain the water and prevent the water from flowing off the sides of the cover. As the cover 17 is a relatively rigid and fairly dense material, the cover is provided with a plurality of small holes 20 through which the water can pass into the chamber containing the mulch 15 and fertilizer 16.

The mulch packet of the invention is a prefabricated unit which contains the proper quantity of mulch, and fertilizer, if desired. In addition, a weed control agent, can be incorporated with the mulch and fertilizer and will prevent the growth of weeds beneath the packet. Alternately, a defoliant can be utilized which will prevent the growth of all vegetation in the soil beneath the packet, but will not deter the growth of the tree 1.

Through the use of the scored or perforated rings 10-12, which can be punched out for insertion around the tree trunk, a standard packet can be utilized for various trunk diameters.

It is also contemplated that when using a cover layer 7 formed of a series of layers of paper, that a protective sealing cover, such as a plastic sheet can be applied to the outer surface of the cover layer for shipping and handling. On installation, the outer sealing layer can be removed so that the cover 7 will have the desired water permeable characteristics.

While the above description has shown the packet to be generally circular in shape, it is contemplated that the packet can take various shapes, such as oval, rectangular, etc. Similarly, the central portion of the packet which contains the scored rings 10-12, can also be formed in various shapes and sizes.

Various modes of carrying out the invention are contemplated as being within the scope of the following claims particularly pointing out and distinctly claiming the subject matter which is regarded as the invention.

I claim:

1. A mulch packet for application to soil surrounding a plant, comprising a base formed of a sheet of perforated plastic, a moisture permeable cover formed of a moisture degradable material, the peripheral edge portion of said cover being attached to the peripheral edge portion of the base and the central portion of the cover being attached flatwise to the central portion of the base, the portion of the cover disposed between the peripheral edge portion and the central portion being spaced above the base to provide an annular compartment between the base and the cover, a quantity of mulch located within said annular compartment, and a plurality of concentric knock-out rings in said central portions, said packet having a slit extending from the innermost of said rings to the outer periphery of the packet.

2. The packet of claim 1, wherein the upper surface of the cover is provided with an upstanding peripheral edge, said ridge preventing the flow of water along the outer surface of the cover.

3. The packet of claim 1, wherein said cover is a rigid member formed of molded cellulosic fibers and is provided with a series of apertures, the upper surface of said cover being provided with a pair of concentric upstanding ridges with water being retained between said ridges and passing downwardly through said apertures into said compartment.

4. The packet of claim 1, and including a quantity of fertilizer disposed in said compartment.

5. The packet of claim 1, wherein the upper surface of the cover is generally concave in shape.

6. A mulch packet for application to soil surrounding a plant, comprising a base formed of a sheet of perforated plastic, a moisture permeable cover formed of superimposed layers of tissue-type paper and having a generally concave upper surface, the peripheral edge portion of said cover being attached to the peripheral edge portion of the base and the central portion of the cover being attached flatwise to the central portion of the base, the portion of the cover disposed between the peripheral edge portion and the central edge portion being spaced above the base to provide an annular compartment between the base and the cover, a quantity of mulch located within said annular compartment, and a plurality of concentric knock-out rings in said central portions, said packet having a slit extending from the innermost of said rings to the outer periphery of the packet.

* * * * *

UNITED STATES PATENT OFFICE
CERTIFICATE OF CORRECTION

Patent No. __3,857,195__  Dated __December 31, 1974__

Inventor(s) __ARTHUR L. JOHNSON__

It is certified that error appears in the above-identified patent and that said Letters Patent are hereby corrected as shown below:

Column 4, line 51  Cancel "edge", second occurrence.

Signed and sealed this 15th day of April 1975.

(SEAL)
Attest:

RUTH C. MASON
Attesting Officer

C. MARSHALL DANN
Commissioner of Patents
and Trademarks